United States Patent
Nishidai et al.

(10) Patent No.: US 7,868,816 B2
(45) Date of Patent: Jan. 11, 2011

(54) RADIO DETECTION DEVICE AND METHOD

(75) Inventors: Tetsuo Nishidai, Nagoya (JP); Hideyuki Ohara, Kizugawa (JP); Hoshibumi Ichiyanagi, Kasugai (JP); Hiroyuki Numata, Kasugai (JP)

(73) Assignee: OMRON Corporation, Kyoto (JP)

( * ) Notice: Subject to any disclaimer, the term of this patent is extended or adjusted under 35 U.S.C. 154(b) by 143 days.

(21) Appl. No.: 12/390,200

(22) Filed: Feb. 20, 2009

(65) Prior Publication Data

US 2009/0213964 A1 Aug. 27, 2009

(30) Foreign Application Priority Data

Feb. 22, 2008 (JP) .............................. 2008-041226

(51) Int. Cl.
*G01S 13/44* (2006.01)

(52) U.S. Cl. .................... 342/70; 342/91; 342/149; 342/152; 342/194; 342/196

(58) Field of Classification Search ............ 342/70–72, 342/80, 91–92, 147, 149–152, 194–196
See application file for complete search history.

(56) References Cited

U.S. PATENT DOCUMENTS

| | | | |
|---|---|---|---|
| 5,402,129 A * | 3/1995 | Gellner et al. ................ 342/70 |
| 5,708,436 A * | 1/1998 | Loiz et al. ................ 342/25 A |
| 6,018,311 A * | 1/2000 | David ........................ 342/196 |
| 6,133,866 A * | 10/2000 | Kanter ........................ 342/16 |
| 7,053,815 B1 * | 5/2006 | Joynson et al. ................ 342/62 |
| 7,532,156 B2 * | 5/2009 | Honda ........................ 342/173 |
| 2007/0152871 A1 * | 7/2007 | Puglia ........................ 342/70 |
| 2008/0030399 A1 * | 2/2008 | Ichiyanagi et al. .......... 342/149 |
| 2008/0186224 A1 * | 8/2008 | Ichiyanagi et al. .......... 342/109 |

FOREIGN PATENT DOCUMENTS

| | | | |
|---|---|---|---|
| EP | 1837679 A1 * | 9/2007 |
| JP | 06-150195 A | 5/1994 |
| JP | 09-090026 A | 4/1997 |

* cited by examiner

*Primary Examiner*—John B Sotomayor
(74) *Attorney, Agent, or Firm*—Osha Liang LLP (57) ABSTRACT

A radio detection device includes two or more reception antennas, for detecting a detecting object by a mono-pulse method; the radio detection device including: a variable gain unit for discretely changing respective signal intensity of a difference signal and a sum signal of each reception signal received by the two or more reception antennas; an A/D conversion unit for performing A/D conversion process on the difference signal or the sum signal, the difference signal or the sum signal having the signal intensity changed by the variable gain unit; an angle calculating portion for calculating an angle by the mono-pulse method using the difference signal and the sum signal after the A/D conversion process by the A/D conversion unit; and a control unit for performing a control of individually switching a conversion magnification of the signal intensity by the variable gain unit with respect to the difference signal and the sum signal.

7 Claims, 7 Drawing Sheets

RADIO DETECTION DEVICE AND METHOD

BACKGROUND OF THE INVENTION

1. Technical Field

The present invention relates to radio detection devices and methods, in particular, to a radio detection device and method with enhanced accuracy.

2. Related Art

Conventionally, a mono-pulse radar is mounted on an own vehicle as a radio detection device (radar) for detecting another vehicle having a possibility of colliding to avoid collision between the own vehicle and the another vehicle (refer to, for example, Japanese Patent Application Laid-Open No. H09-90026, Japanese Patent Application Laid-Open No. H06-150195).

The mono-pulse type is one type of performing angle detection. That is, the mono-pulse radar detects an angle of a detecting object with respect to his/her center direction on the front side. In other words, if the mono-pulse radar is mounted at a front portion of the own vehicle, another vehicle on the front side of the own vehicle becomes the detecting object, and the angle of the another vehicle on the front side of the own vehicle is detected by the mono-pulse radar. If the mono-pulse radar is mounted at a rear portion of the own vehicle, another vehicle on the rear side of the own vehicle becomes the detecting object, and the angle of the another vehicle on the rear side of the own vehicle is detected by the mono-pulse radar.

A brief overview of the mono-pulse type will be further described below with reference to FIGS. 1 and 2.

Figure 1:
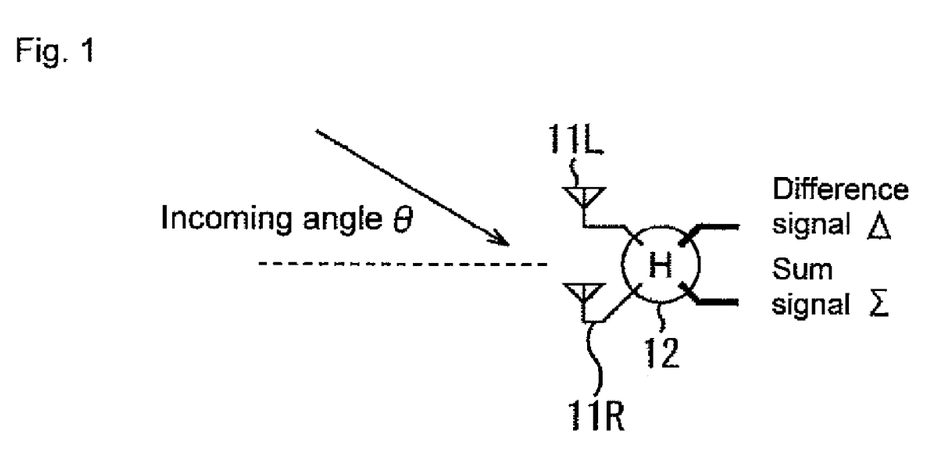
FIG. 1 shows a view describing a mono-pulse type.
Figure 2:
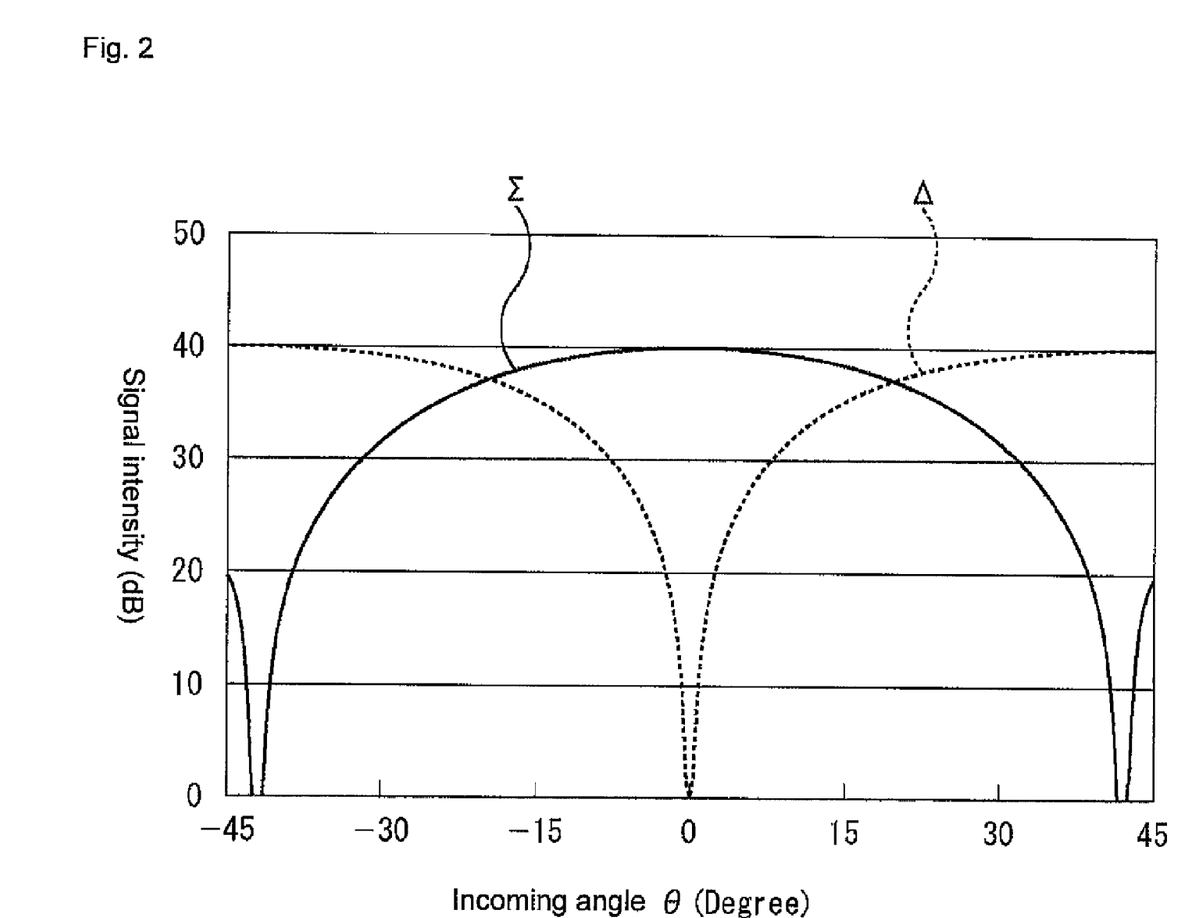
FIG. 2 shows a view showing properties of a sum signal and a difference signal of the mono-pulse type.

In the conventional mono-pulse radar, a transmission antenna is arranged, and reception antennas 11L, 11R are respectively arranged at a predetermined spacing in the vicinity of the transmission antenna, as shown in FIG. 1. In the conventional mono-pulse radar, a signal processing unit 12 is also arranged.

A transmission signal from the transmission antenna is reflected by a detecting object, and the reflected signal is received by the reception antennas 11L, 11R as reception signal and provided to the signal processing unit 12. The signal processing unit 12 generates and outputs a difference signal $\Delta$, which is a difference between the two reception signals, and a sum signal $\Sigma$, which is a sum of the two reception signals. Each intensity of the difference signal $\Delta$ and the sum signal $\Sigma$ have properties shown in FIG. 2 according to an incoming angle $\theta$, that is, an angle $\theta$ with the detecting object.

The mono-pulse radar calculates the angle $\theta$ of the detecting object based on a ratio of the signal intensities of the sum signal $\Sigma$ and the difference signal $\Delta$.

SUMMARY

However, since the signal intensity of the sum signal $\Sigma$ and the difference signal $\Delta$ changes about 40 dB, if the change in the signal amplitude with respect to an input range is significantly small in an A/D conversion process, there is no change or small variation in width in the discretized value after the A/D conversion, and an error occurs in the angle calculation. If the signal amplitude is over the input range of the A/D conversion, the value after the A/D conversion saturates at the upper limit, and error occurs in the angle calculation. Seven bits are necessary even when taking only the amount of change in the signal intensity caused by the change in angle $\theta$ with the detecting object into consideration, and greater bits are required when further taking the change in signal intensity caused by distance and reflectivity into consideration.

In the conventional mono-pulse radar, a high resolution A/D conversion circuit is used to enhance the measurement accuracy. The cost increases in the high resolution A/D conversion circuit by the high resolution, and as a result, the cost of the mono-pulse radar increases.

One or more embodiments of the present invention embodies a mono-pulse radar in which the accuracy is enhanced without using a high resolution A/D conversion circuit.

In accordance with one aspect of the present invention, a radio detection device includes two or more reception antennas, for detecting a detecting object by a mono-pulse method; the radio detection device including a variable gain means for discretely changing respective signal intensity of a difference signal and a sum signal of each reception signal received by the two or more reception antennas; an A/D conversion means for performing A/D conversion process on the difference signal or the sum signal, the difference signal and the sum signal having a signal intensity changed by the variable gain means; an angle calculating means for calculating an angle by the mono-pulse method using the difference signal and the sum signal after the A/D conversion process by the A/D conversion means; and a control means for performing a control of individually switching a conversion magnification of the signal intensity by the variable gain means with respect to the difference signal and the sum signal.

The radio detection device with enhanced accuracy is thereby embodied.

For instance, the radio detection device is configured by a mono-pulse radar and the like.

The variable gain means can be configured by a PGA (Programmable Gain Amplifier), and the like. The A/D conversion means can be configured by an A/D conversion circuit and the like. The angle calculating means is configured to include a circuit for performing calculation process, a computer for executing signal processing serving as software, and the like. The control means is configured to include a circuit for performing calculation process, a computer for executing signal processing serving as software, and the like.

The angle calculating means and the control means may be included in the same device such as a microcomputer.

The control means compares the respective signal intensity of the difference signal and the sum signal with a predetermined threshold value, and performs a control of switching the conversion magnification of the variable gain means based on the result.

Since the changing degree of the signal intensity of the difference signal and the sum signal becomes appropriate with respect to the input range of the A/D conversion means, improvement can be made on the value after A/D conversion from saturating or becoming too small.

The control means may include a difference signal peak/holding means for holding a peak value and a bottom value of the difference signal outputted in a predetermined period by the A/D conversion means; a difference signal threshold value determining means, set with a peal value threshold value and a bottom value threshold value as the predetermined threshold value, for comparing the peak value held in the difference signal peak/bottom holding means and the peak value threshold value, comparing the bottom value held in the difference signal peak/bottom holding means and the bottom value threshold value, and determining a conversion magnification with respect to the difference signal of the variable gain means based on the results of the comparisons; a sum signal peak/bottom holding means for holding a peak value and a bottom value of the sum signal outputted in a predetermined period by the A/D conversion means; and a sum signal threshold value determining means, set with a peak value threshold value and a bottom value threshold value as the predetermined threshold value, for comparing the peak value held in the sum signal peak/bottom holding means and the peak value threshold value, comparing the bottom value held in the sum signal peak/bottom holding means and the bottom value threshold value, and determining a conversion magnification with respect to the sum signal of the variable gain means based on the results of the comparisons.

For instance, the difference signal and the sum signal peak/bottom holding means, as well as, the threshold value determining means are configured to include a circuit for performing calculation process, a computer for executing signal processing serving as software, and the like.

A more appropriate control process of the switching of the conversion magnification of the variable gain means then can be executed.

The threshold value determining means may determine either one of A times of B times (A, B are different numerical values) as the conversion magnification on the difference signal and the sum signal of the variable gain means.

As a state of the radio detection device, a first state in which the conversion magnification of the variable gain means is A times and a second state in which the conversion magnification of the variable gain means is B times independently exist for the sum signal and the difference signal; as the peak value threshold value, a threshold value used when the conversion magnification of the variable gain means is B times is set as +Th_H, and a threshold value used when the conversion magnification is A times is set as +Th_L; as the bottom value threshold value, a threshold value used when the conversion magnification of the variable gain means is B times is set as −Th_H, and a threshold value used when the conversion magnification is A times is set as −Th_L; a full scale range of the A/D conversion means is described as FSR, a center value of the FSR is described as zero, a value of half of the FSR on the peak side with respect to zero is described as +FSR/2, and a value of half of the FSR on the bottom side with respect to zero is described as −FSR/2; and the difference signal threshold value determining means or the sum signal threshold value determining means performs a control with respect to a target signal, which is the difference signal or the sum signal, to determine the conversion magnification on the target signal of the variable gain means of, maintaining the first state when a peak value is between +Th_L and +FSR/2 or a bottom value is between −Th_L and −FSR/2 in the first state with respect to the target signal of a predetermined period, transitioning to the second state when a peak value is between +Th_L and 0 and a bottom value is between −Th_L and 0 in the first state with respect to the target signal of the predetermined period, maintaining the second state when a peak value is between +Th_H and 0 and a bottom value is between −Th_H and 0 in the second state with respect to the target signal of the predetermined period, and maintaining the second state when a peak value is between +Th_H and +FSR/2 or a bottom value is between −Th_H and −FSR/2 in the second state with respect to the target signal of the predetermined period.

The variable gain means can be configured by a PGA (Programmable Gain Amplifier) and the like capable of discretely switching the gain to B times (more specifically, 2n times) or A times (more specifically, 1 time). That is, the PGA of a simple configuration in which the switching of the gain is completed in one stage, and gain varying of satisfactory accuracy can be realized is adopted as the variable gain means.

The radio detection method of one aspect of the present invention is a method corresponding to the radio detection device of one aspect of the present invention.

Therefore, according to one or more embodiments of the present invention, an object can be detected using the mono-pulse method. In particular, the mono-pulse radar with enhanced accuracy can be embodied.

DETAILED DESCRIPTION

An embodiment of the present invention will be described with reference to the drawings.

Figure 3:
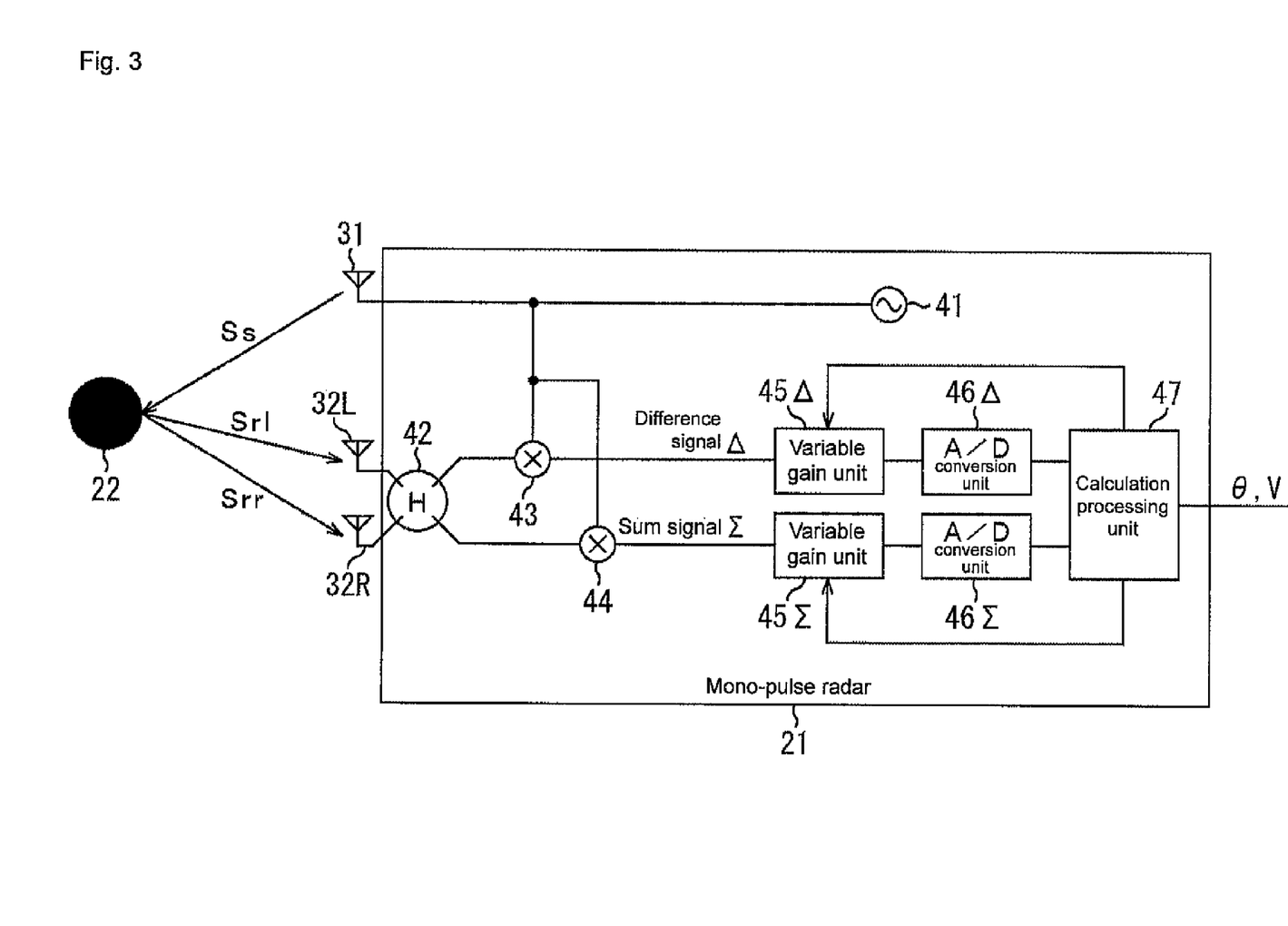
FIG. 3 shows a function block diagram showing a functional configuration example of a mono-pulse radar applied with one or more embodiments of the present invention.

FIG. 3 shows a function block diagram showing a function of a mono-pulse radar 21 serving as a radio detection device applied with one or more embodiments of the present invention.

A transmission antenna 31 and two reception antennas 32L, 32R are arranged as antennas of the mono-pulse radar 21.

A transmission signal generation unit 41 generates a transmission signal Ss. The transmission signal Ss is transmitted from the antenna 31. The mode of the transmission signal Ss generated by the transmission signal generation unit 41 is not particularly limited as long as a phase difference can be obtained from the reception signal. For instance, CW, two-frequency CW, FMCW, and the like can be used.

The transmission signal Ss is reflected by a detecting object 22, and a reflected signal is received by the reception antenna 32L as a reception signal Srl and received by the reception antenna 32R as a reception signal Srr.

A signal processing unit 42 generates a difference between the reception signal Srl and the reception signal Srr as a signal, and outputs the signal to a mixing unit 43. The mixing unit 43 performs a mixing process of an output signal of the signal processing unit 42 and the transmission signal Ss generated by the transmission signal generation unit 41 to generate a difference signal Δ, and provides such signal to a variable gain unit 45Δ. The variable gain unit 45Δ varies (including 1 time) a signal intensity of the difference signal Δ, and provides the same to an A/D conversion unit 46Δ. Here, variable power means changing the signal intensity to a predetermined magnification (in status quo, handling as changing from 1 time to 1 time). A variable power method of the signal intensity of the difference signal Δ by the variable gain unit 45Δ will be hereinafter described with reference to the drawings after FIG. 4. The A/D conversion unit 46Δ converts the difference signal Δ serving as an analog signal to a digital signal, and provides the same to a calculation processing unit 47.

The signal processing unit 42 generates a signal obtained by adding the reception signal Srr and the reception signal Srl, and outputs the same to a mixing unit 44. The mixing unit 44 performs the mixing process of the output signal of the signal processing unit 42, and the transmission signal Ss generated by the transmission signal generation unit 41 to generate a sum signal Σ, and provides such signal to a variable gain unit 45Σ. The variable gain unit 45Σ varies (including 1 time) the signal intensity of the sum signal Σ, and provides the same to a A/D conversion unit 46Σ. The variable power method of the signal intensity of the sum signal Σ by the variable gain unit 45Σ will be hereinafter described with reference to the drawings after FIG. 4. The A/D conversion unit 46Σ converts the sum signal Σ serving as the analog signal to the digital signal, and provides the same to the calculation processing unit 47.

The calculation processing unit 47 calculates and outputs an incoming angle θ, that is, an angle θ of the detecting object 22 based on a ratio of the signal intensity of the sum signal Σ from the A/D conversion unit 46Σ and the difference signal Δ from the A/D conversion unit 46Δ. The calculation processing unit 47 also calculates and outputs a relative speed V with the detecting object 22.

Figure 4:
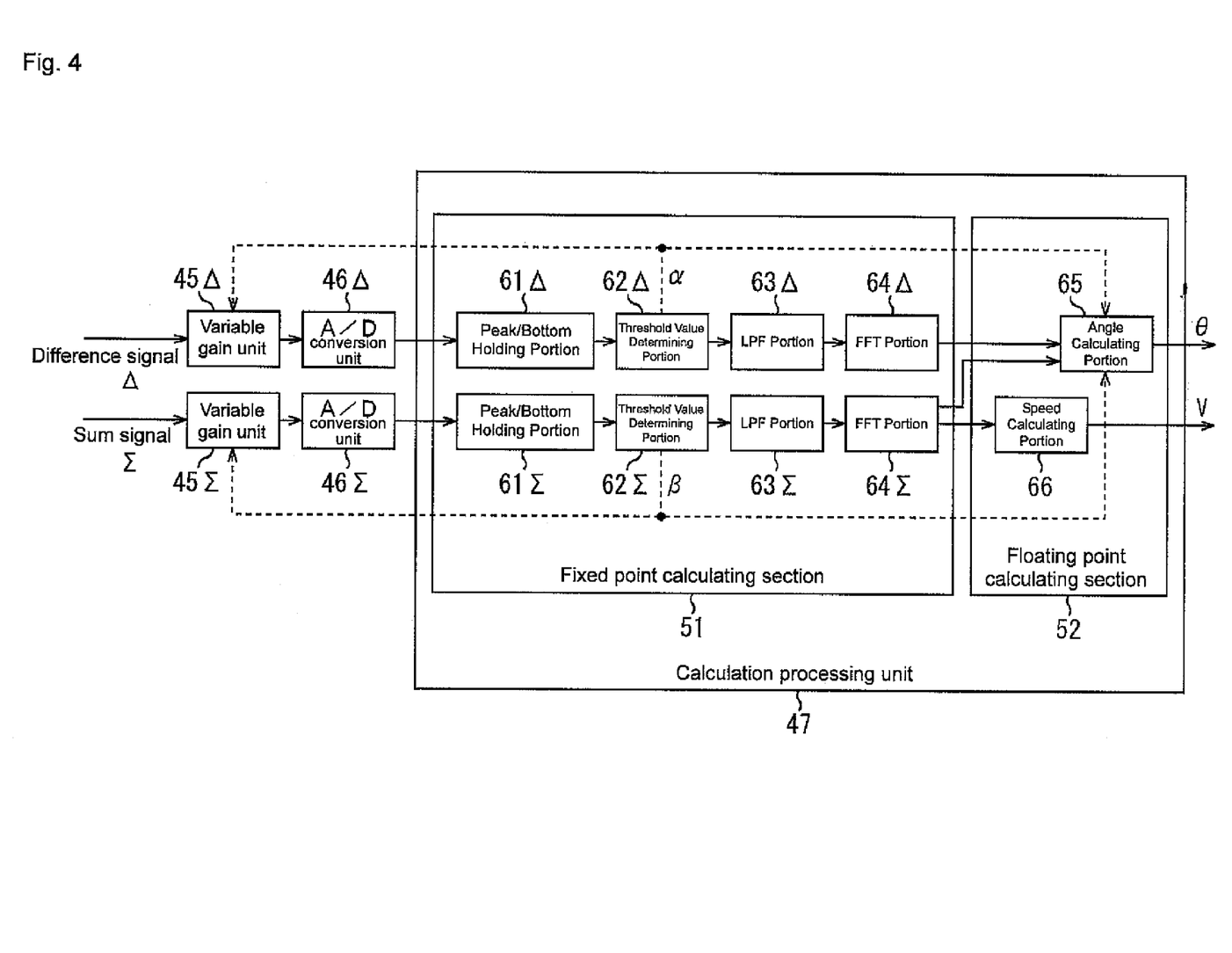
FIG. 4 shows a function block diagram showing a detailed functional configuration example of a calculation processing unit of the mono-pulse radar of FIG. 3.

FIG. 4 shows a function block diagram showing details of the function of the calculation processing unit 47.

The calculation processing unit 47 includes a fixed point calculating section 51 and a floating point calculating section 52.

The fixed point calculating section 51 is arranged with a peak/bottom holding portion 61Δ, a threshold value determining portion 62Δ, an LPF portion 63Δ, and an FFT portion 64Δ to perform a calculation process by fixed point for the difference signal Δ, where such portions are connected in the relevant order.

The fixed point calculating section 51 is arranged with a peak/bottom holding portion 61Σ, a threshold value determining portion 62Σ, an LPF portion 63Σ, and an FFT portion 64Σ to perform a calculation process by fixed point for the sum signal Σ, where such portions are connected in the relevant order.

The floating point calculating section 52 is arranged with an angle calculating portion 65 and a speed calculating portion 66 to perform a calculation process by floating point.

The operation of the mono-pulse radar 21 having the configuration shown in FIGS. 3 and 4 will be described below. The description on the function of each function block will also be made as necessary. The operation until generating the difference signal Δ and the sum signal Σ is basically the same as the conventional mono-pulse radar of FIG. 1. The description thereof will thus be omitted. In other words, only the operation on the portions shown in FIG. 4 of the mono-pulse radar 21 will be described.

The variable gain unit 45Δ is configured as a variable gain amplifier or an attenuator capable of switching to B times (more specifically, $2^n$ times etc.) or A times (more specifically, to 1 time etc.). Specifically, in the present embodiment, the variable gain unit 45Δ is configured as a variable gain amplifier capable of switching to n=4, that is, 16 times or 1 time.

When the difference signal Δ serving as an analog signal is inputted to the variable gain unit 45Δ, the signal intensity is converted to gain of G times (G is, for example, an integer value to which it is switched of 1 and 16 in the present embodiment), converted to a digital signal in the A/D conversion unit 46Δ, and provided to the peak/bottom holding portion 61Δ.

The gain switching process of the variable gain unit 45Δ, that is, the process of switching the gain G to 1 time or 16 times is performed based on a control signal α from the threshold value determining portion 62Δ. The method of such gain switching process will be hereinafter described with reference to FIGS. 5 and 6.

The peak/bottom holding portion 61Δ determines whether or not the signal intensity of the difference signal Δ sequentially provided from the A/D conversion unit 46 exceeds a peak value (maximum value of signal intensity) or a bottom value (minimum value of signal intensity) currently being held, and adopts (updates) the signal intensity of the difference signal Δ as the peak value or the bottom value when it is determined that the signal intensity of the difference signal Δ exceeds the peak value or the bottom value. That is, the peak/bottom holding portion 61Δ holds the peak value and the bottom value of the difference signal Δ from the A/D conversion unit 46Δ for a predetermined period (e.g., for 20 ms). The peak/bottom holding portion 61Δ provides the holding result, that is, the peak value and the bottom value of the difference signal Δ of a predetermined period to the threshold value determining portion 62Δ after elapse of a predetermined period.

In the threshold value determining portion 62Δ, a threshold value (hereinafter referred to as peak value threshold value) to be compared with the peak value of the difference signal Δ, and a threshold value (hereinafter referred to as bottom value threshold value) to be compared with the bottom value of the difference signal Δ are set. Furthermore, the peak value threshold value (hereinafter described as +Th_H) used when the gain G of the variable gain unit 45Δ is set to 16 times and the peak value threshold value (hereinafter described as +Th_L) used when the gain G is set to 1 time are set for the peak value threshold value. The bottom value threshold value (hereinafter described as −Th_H) used when the gain G is set to 16 times and the bottom value threshold value (hereinafter described as −Th_L) used when the gain G is set to 1 time are set for the bottom value threshold value.

Specifically, the +Th_H has the value set to be smaller by about a few % than the value of half of FSR (full scale range) of the A/D conversion unit 46Δ, and +Th_L has the value set to be in a value of half of the FSR even when made to 16 times.

Similarly, −Th_H has the absolute value set to be smaller by a few % than the value of half of the FSR of the A/D conversion unit 46Δ, and −Th_L has the absolute value set to be in a value of half of the FSR even when made to 16 times.

The threshold value determining portion 62Δ determines the relationship between the peak value of the difference signal Δ of a predetermined period and the peak value threshold values +Th_H, +Th_L, and the relationship between the bottom value of the difference signal Δ of a predetermined period and the bottom value threshold values −Th_H, −Th_L, then generates the control signal α based on the determination result, and provides the same to the variable gain unit 45Δ.

Thus, if the value of the difference signal Δ is small compared to the FSR, for example, the control signal α to raise the gain of the variable gain unit 45Δ is outputted, so that the signal intensity is converted to an appropriate level. If the value of the difference signal Δ becomes too large compared to the FSR, the control signal α to reduce the gain of the variable gain unit 45Δ is outputted, so that the signal intensity is converted to an appropriate level.

In other words, the gain of the variable gain unit 45Δ can be appropriately set by evaluating the signal intensity for every predetermined period by the threshold value determining portion 62Δ.

The control signal α is a signal indicating 1 or 16 in the present embodiment. The signal indicating 1 or 16 merely needs to be a signal for identifying whether 1 or 16 in the variable gain unit 45Δ and the angle calculating portion 65, and the mode is not particularly limited. With the control signal α as a flag, 16 is indicated when the flag is up and 1 is indicated when the flag is down, where the mono-pulse radar 21 is configured so that such flag state is recognized by the variable gain unit 45Δ and the angle calculating portion 65. For the sake of convenience of the explanation, the signal indicating 16 of the control signal α is described as control signal α=16, and the signal indicating 1 is described as control signal α=1.

A detailed example of the operation of the threshold value determining portion 62Δ will be described with reference to FIG. 5.

Figure 5:
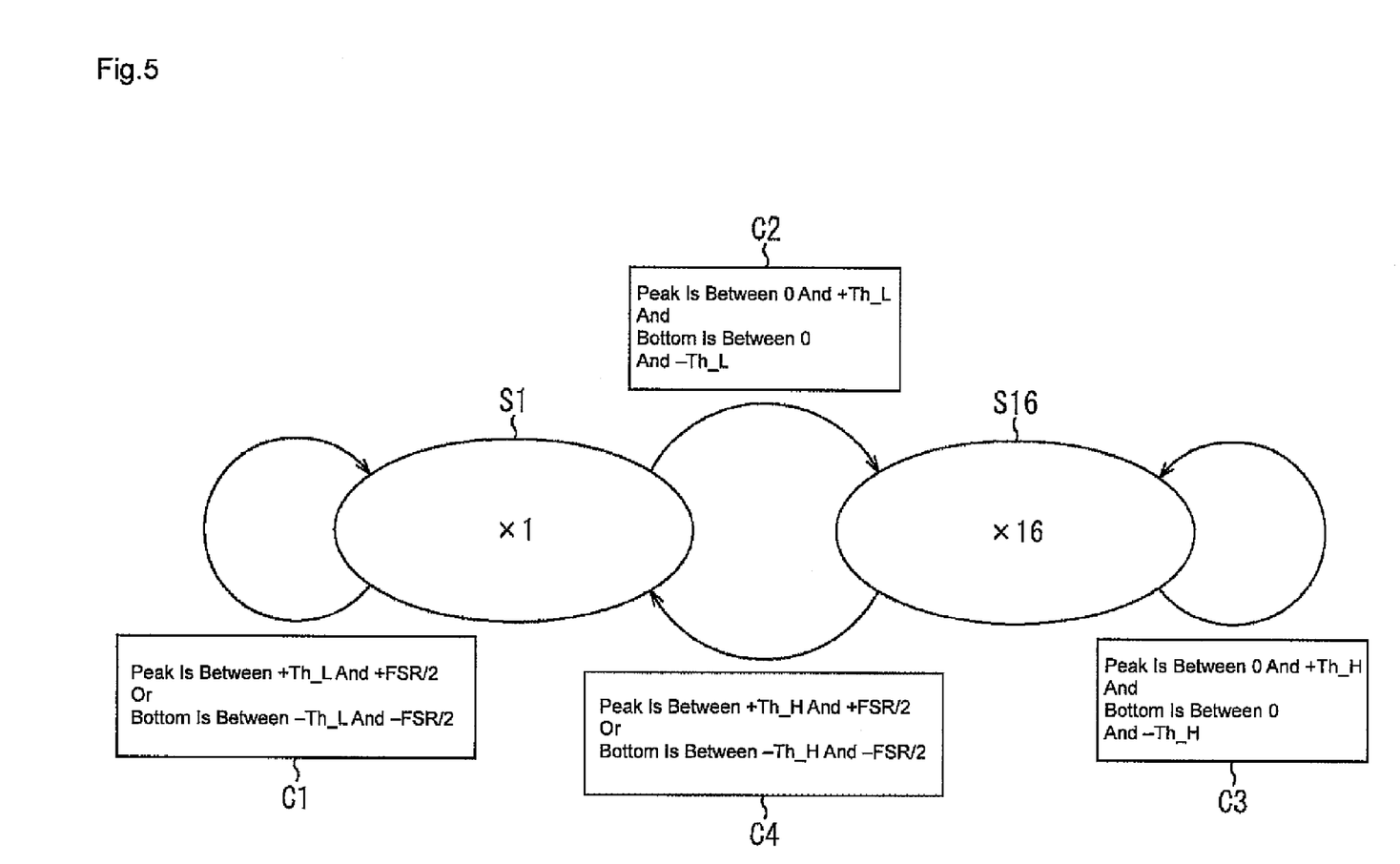
FIG. 5 shows a state transition diagram showing each example of the states of the mono-pulse radar of FIG. 3.

FIG. 5 shows one example of each state that can be taken by a system (variable gain unit 45Δ to FFT portion 64Δ) of the difference signal Δ of the mono-pulse sensor 21.

In FIG. 5, each state is shown with one elliptical shape, and is distinguished by a reference numeral including "S" drawn for the elliptical shape. The state transition (including case of retaining in the same state) from one state to another state is executed when a predetermined condition (hereinafter referred to as state transition condition) is satisfied. Such state transition condition is represented by giving a reference numeral including "C" to an arrow representing the transition from one state to another state in FIG. 5.

If the difference signal Δ needs to be clearly distinguished between a stage before inputted to the variable gain unit 45Δ and a stage after outputted, the difference signal Δ before inputted is specifically referred to as difference signal Δin, and the difference signal Δ after outputted is specifically referred to as difference signal Δout. This naming is similarly adopted for the sum signal Σ.

Here, state S1 refers to a state in which the threshold value determining portion 62Δ outputs the control signal α=1. In this case, the gain G is 1 time in the variable gain unit 45Δ. That is, the difference signal Δout is provided to the A/D conversion unit 46Δ with the signal intensity (1 time) of the difference signal Δin. In addition, α=1 is substituted in the calculation of equation (1) performed in the angle calculating portion 65 to be hereinafter described.

State S16 refers to a state in which the threshold value determining portion 62Δ outputs the control signal α=16. In this case, the gain G is 16 times in the variable gain unit 45Δ. That is, the difference signal Δout is amplified to the signal intensity of 16 times with respect to the difference signal Δin, and provided to the A/D conversion unit 46Δ. In addition, α=16 is substituted in the calculation of equation (1) performed in the angle calculating portion 65 to be hereinafter described.

The threshold value determining portion 62Δ determines that a state transition condition C1 is satisfied when the peak value of the difference signal Δout of the predetermined period is between +Th_L and +FSR/2 or the bottom value is between −Th_L and −FSR/2 in state S1, and the state then transitions to state S1. That is, if the amplitude of the difference signal Δout of the predetermined period is ensured at greater than or equal to a constant in state S1, state S1 is maintained, and as a result, the control signal α=1 is outputted from the threshold value determining portion 62Δ.

On the other hand, the threshold valued determining portion 62Δ determines that a state transition condition C2 is satisfied when the peak value of the difference signal Δout of the predetermined period is between +Th_L and 0 and the bottom value is between −Th_L and 0 in state S1, and the state then transitions to state S16. The control signal α=16 is then outputted from the threshold value determining portion 62Δ, and thus the gain G becomes 16 times in the variable gain unit 45Δ from the next predetermined period. That is, the difference signal Δout is amplified to the signal intensity of 16 times with respect to the difference signal Δin, and provided to the A/D conversion unit 46Δ. In addition, α=16 is substituted in the calculation of equation (1) performed in the angle calculating portion 65 to be hereinafter described.

The threshold value determining portion 62Δ determines that a state transition condition C3 is satisfied when the peak value of the difference signal Δout of the predetermined period is between +Th_H and 0 and the bottom value is between −Th_H and 0 in state S16, and the state then transitions to state S16. That is, if the amplitude of the difference signal Δout of the predetermined period is smaller than or equal to a predetermined value in state S16, state S16 is maintained, and as a result, the control signal α=16 is outputted from the threshold value determining portion 62Δ.

On the other hand, the threshold valued determining portion 62Δ determines that a state transition condition C4 is satisfied when the peak value of the difference signal Δout of the predetermined period is between +Th_H and +FSR/2 or the bottom value is between −Th_H and −FSR/2 in state S16, and the state then transitions to state S1. The control signal α=1 is then outputted from the threshold value determining portion 62Δ, and thus the gain G becomes 1 time in the variable gain unit 45Δ from the next predetermined period. That is, the difference signal Δout is provided to the A/D conversion unit 46Δ with the signal intensity of the difference signal Δin as is (1 time). In addition, α=1 is substituted in the calculation of equation (1) performed in the angle calculating portion 65 to be hereinafter described.

This description can be summarized as the following. The difference signal Δout (sum signal Σ will be hereinafter described) of the waveform shown in FIG. 6 is outputted from the variable gain unit 45Δ, converted to a digital signal in the A/D conversion unit 46Δ, and then inputted to the threshold value determining portion 62Δ.

Figure 6:
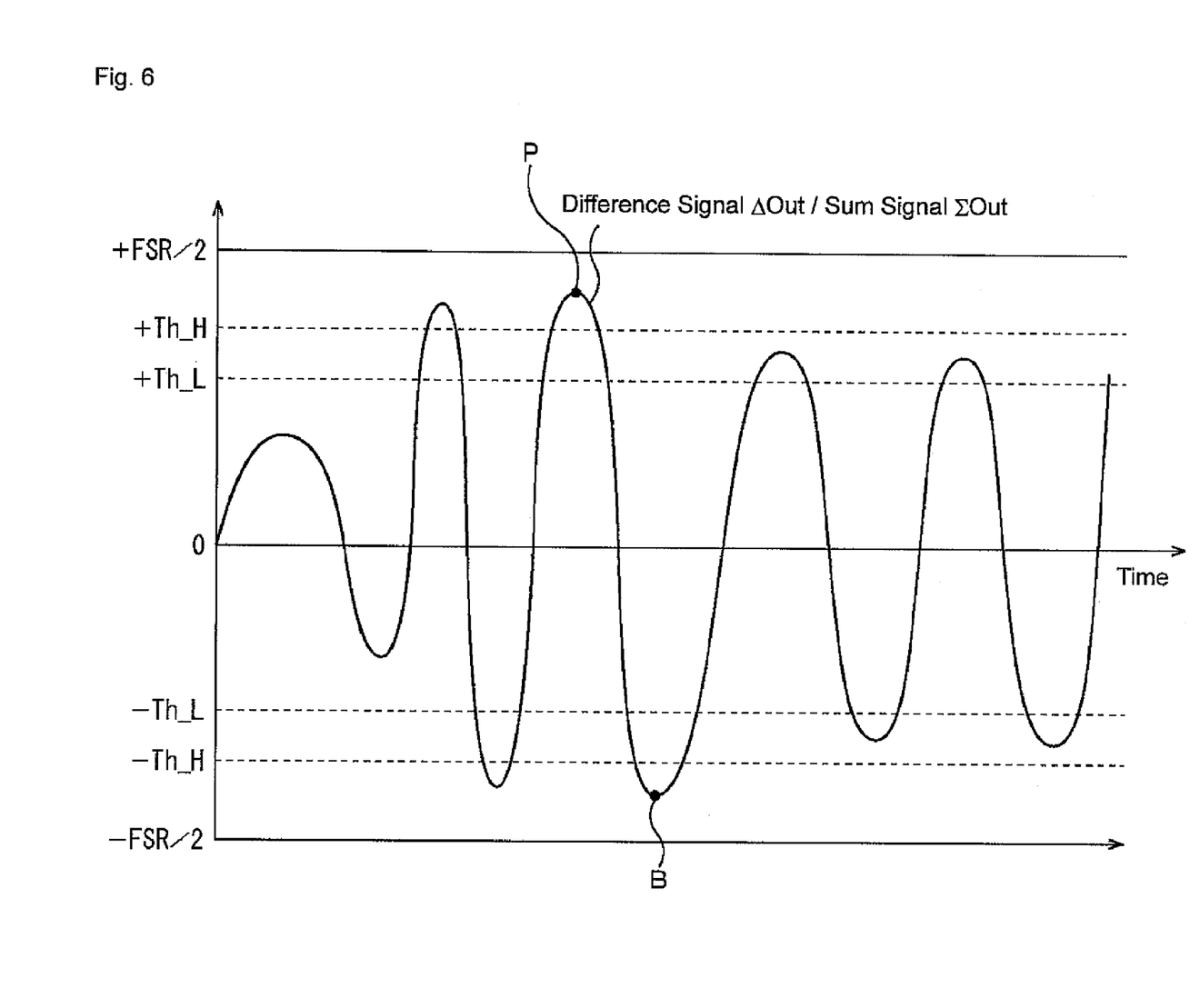
FIG. 6 shows a view describing a processing example of the calculation processing unit according to the state transition diagram of FIG. 5.

As shown in FIG. 6, the maximum value (e.g., value of point P in the figure) existing on the +FSR/2 side of the waveform of the difference signal Δout in the predetermined period becomes the peak value, and the minimum value (maximum value in terms of absolute value, e.g., value of point B in the figure) existing on the −FSR/2 side becomes the bottom value.

It is supposed that the initial state is in state S1, that is, the control signal α=1 is outputted from the threshold value determining portion 62Δ. In this case, the difference signal Δin is not amplified (amplified to 1 time) in the variable gain unit 45Δ in the initial state, and as a result, the difference signal Δout is provided to the A/D conversion unit 46Δ with the signal intensity of the difference signal Δin as is (1 time), and the difference signal is converted to a digital signal in the A/D conversion unit 46Δ and then provided to the threshold value determining portion 62Δ.

As long as the amplitude of the signal intensity of the difference signal Δout of the predetermined period is ensured at greater than or equal to a constant, the state S1 continues to be held. Thus, the difference signal Δout is provided to the A/D conversion unit 46Δ with the signal intensity of the difference signal Δin as is (1 time), and the difference signal is converted to a digital signal in the A/D conversion unit 46Δ and then provided to the threshold value determining portion 62Δ.

When the amplitude of the signal intensity of the difference signal Δout of the predetermined period thereafter becomes smaller than a constant value, the state transitions to state S16. The signal intensity of the difference signal Δin in the next predetermined period is then amplified to 16 times by the variable gain unit 45Δ, and the difference signal Δout obtained as a result, that is, the difference signal Δout having a signal intensity of 16 times the difference signal Δin is provided to the A/D conversion unit 46Δ, and the difference signal out is converted to a digital signal in the A/D conversion unit 46Δ and then provided to the threshold value determining portion 62Δ.

As long as the amplitude of the signal intensity of the difference signal Δout of the predetermined period maintains a constant value, the state S16 continues to be held. Thus, the difference signal Δout having a signal intensity of 16 times the difference signal Δin is provided to the A/D conversion unit 46Δ, and the difference signal is converted to a digital signal in the A/D conversion unit 46Δ and then provided to the threshold value determining portion 62Δ.

When the amplitude of the signal intensity of the difference signal Δout in the predetermined period thereafter becomes greater than or equal to a predetermined value, the state again transitions to state S1. Thus, the difference signal Δout of the next predetermined period is provided to the A/D conversion unit 46Δ with the signal intensity of the difference signal Δin as is (1 time), and the difference signal is converted to a digital signal in the A/D conversion unit 46Δ and then provided to the threshold value determining portion 62Δ.

The signal intensity of the difference signal Δout can have the peak value converged to the threshold value +Th_H to +Th_L and the bottom value converged to the threshold value −Th_L to −Th_H determined based on the quantization bit rate (FSR: Full Scale Range) of the A/D conversion unit 46Δ by performing the control of gain switching of the variable gain unit 45Δ in the above manner. That is, since the changing degree of the signal intensity of the difference signal Δout becomes suitable with respect to the input range of the A/D conversion unit 46Δ, improvement can be made on the value after A/D conversion from saturating or becoming too small.

Returning to FIG. 4, the difference signal Δout sequentially outputted from the variable gain unit 45Δ and sequentially inputted to the peak/bottom holding portion 61 through the A/D conversion unit 46Δ is also sequentially provided to the LPF portion 63Δ through the threshold value determining portion 62Δ.

The LPF portion 63Δ performs the LPF (Low Pass Filter) process on the difference signal Δout, and provides the resultant signal to the FFT portion 64Δ. The FFT portion 64Δ performs the FFT (Fast Fourier Transform) analysis process on the difference signal Δout after the LPF process, and provides the result of the FFT analysis to the angle calculating portion 65.

Processes basically similar to the processes of the variable gain unit 45Δ to the FFT portion 64Δ on the difference signal Δ are executed as processes of the variable gain unit 45 Σ to the FFT portion 64Σ on the sum signal Σ. That is, each of the variable gain unit 45Σ to the FFT portion 64Σ has a function and a configuration basically the same as the variable gain unit 45Δ to the FFT portion 64Δ.

In other words, FIG. 5 also shows one example of each state that can be taken by a system (variable gain unit 45Σ to FFT portion 64Σ) of the sum signal Σ of the mono-pulse sensor 21.

However, in this case, the state S1 refers to a state in which a control signal β=1 is outputted from the threshold value determining portion 62Σ. In this case, the gain G is 1 time in the variable gain unit 45Σ. That is, the sum signal Σout is provided to the A/D conversion unit 46Σ with the signal intensity (1 time) of the sum signal Σin. In addition, β=1 is substituted in the calculation of equation (1) performed in the angle calculating portion 65 to be hereinafter described.

State S16 refers to a state in which a control signal β=16 is outputted from the threshold value determining portion 62Σ. In this case, the gain G is 16 times in the variable gain unit 45Σ. That is, the sum signal Σout is amplified to a signal intensity of 16 times the sum signal Σin, and provided to the A/D conversion unit 46Σ. In addition, β=16 is substituted in the calculation of equation (1) performed in the angle calculating portion 65 to be hereinafter described.

The angle calculating portion 65 performs the calculation of equation (1) to calculate the incoming angle θ, that is, the angle θ of the detecting object, and outputs the result.

$$\theta = \sin^{-1}\left( \tan^{-1} \frac{\left(\frac{\Delta V_p}{\alpha}\right)}{\left(\frac{\Sigma V_p}{\beta}\right)} \cdot \frac{c}{\pi \cdot f_c \cdot L} \right) \quad \text{Equation 1}$$

In equation (1), α=1 is substituted when the control signal α=1 is provided and α=16 is substituted when the control signal α=16 is provided, as described above. Furthermore, β=1 is substituted when the control signal β=1 is provided, and β=16 is substituted when the control signal β=16 is provided.

In equation (1), ΔVp indicates the quantity corresponding to the signal intensity on the detecting object 22 of the FFT results of the difference signal Δout provided from the FFT 64Δ portion. Furthermore, ΣVp indicates the quantity corresponding to the signal intensity on the detecting object 22 of the FFT results of the sum signal Σout provided from the FFT portion 64Σ. Here, c indicates speed of light. Furthermore, fc indicates carrier frequency, and L indicates the spacing between the reception antennas 32L, 32R.

The speed calculating portion 66 performs the calculation of equation (2) to calculate the relative speed V with the detecting object 22 and outputs the result.

$$V = \frac{c \cdot f_d}{2 \cdot f_c} \quad \text{Equation 2}$$

In equation (2), fd indicates Doppler frequency on the detecting object 22 of the FFT results of the sum signal Σout provided from the FFT portion 64Σ. In equation (2) as well, c indicates speed of light and fc indicates carrier frequency, similar to equation (1).

As described above, in the mono-pulse radar 21 having the configuration of FIGS. 3 and 4, the variable gain units 45Δ, 45Σ configured as a variable gain amplifier of $2^n$ times or as an attenuator, specifically in the present embodiment, the variable gain units 45Δ, 45Σ configured as a variable gain amplifier of n=4 (16 times) are arranged at the pre-stage of the A/D conversion units 46Δ, 46Σ, respectively.

Each set of the peak/bottom holding portion 61Δ, 61Σ having the peak/bottom hold function and the threshold value determining portion 62Δ, 62Σ having the threshold value determining function is arranged at each post-stage of the A/D conversion unit 46Δ, 46Σ.

Each set of the peak/bottom holding portion 61Δ, 61Σ having the peak/bottom hold function and the threshold value determining portion 62Δ, 62Σ having the threshold value determining function executes a state transition process according to the state transition diagram of FIG. 5 based on the comparison result of the peak value/bottom value and the threshold value +Th_H/+Th_L/−Th_L/−Th_H for every predetermined period. The switch control of the gain G of the variable gain units 45Δ, 45Σ is performed based on the result of the state transition process.

When the gain G of the variable gain units 45Δ, 45Σ is changed to $2^n$ times (16 times in the present embodiment) based on the result of the state transition process, a process equivalent to having each signal intensity to ($1/2^n$ times) is executed in angle calculation in the angle calculating portion 65 to cancel the amount of change. The process equivalent to having each signal intensity to ($1/2^n$ times) corresponds to the calculation process of (ΔVp/α) or the calculation process of (ΣVp/β) in equation (1), for example.

Therefore, the fixed point calculation accuracy in the fixed point calculating section 51 does not degrade even when compared to the related art. Furthermore, in the variable gain unit 45Δ, 45Σ, the signal intensity (gain G) of the difference signal Δ and the sum signal Σ can be suitably switched, and thus improvement can be made on the value after A/D conversion from saturating or becoming too small. Thus, a low resolution A/D conversion circuit, which is inexpensive compared to the related art, can be used for the A/D conversion units 46Δ, 46Σ. That is, a mono-pulse radar of enhanced accuracy can be realized by embodying the mono-pulse radar 21 having the configuration of FIG. 4 and the like.

The embodiment of the mono-pulse radar applied with the present invention is not limited to the embodiment of FIG. 4.

For instance, the switching of the gain may be in two or more stages. The gain in two or more stages may be set by more finely performing the determination in the threshold value determining portions 62Δ, 62Σ.

For instance, the peak/bottom holding portions 61Δ, 61Σ having a peak/bottom holding function and the threshold value determining portions 62Δ, 62Σ having a threshold value determining function are not essential configuration in the present invention.

In other words, although not shown, the following function block may be adopted in place of the peak/bottom holding portions 61Δ, 61Σ and the threshold value determining portions 62Δ, 62Σ. The function block having a function of performing the control of gain switching of the variable gain units 45Δ, 45Σ so as to converge the signal intensity of the difference signal Δout and the sum signal Σout to between two peak value threshold values (e.g., between threshold value Th_H and Th_L in the above example) and between two bottom value threshold values (e.g., between threshold value −Th_L and −Th_H in the above example) determined based on the quantization bit rate of the A/D conversion units 46Δ, 46Σ may be adopted.

Furthermore, although not shown, the following function block may be adopted in place of the peak/bottom holding portions 61Δ, 61Σ and the threshold value determining portions 62Δ, 62Σ. The function block having a function of monitoring the difference in signal intensities of the difference signal Δout and the sum signal Σout, and performing the control of gain switching of the variable gain units 45Δ, 45Σ based on the difference, for example, performing the control of gain switching of the variable gain units 45Δ, 45Σ using, as a condition, a time when the difference becomes greater than or equal to a predetermined threshold value.

Moreover, although not shown, the following function block may be adopted in place of the peak/bottom holding portions 61Δ, 61Σ and the threshold value determining portions 62Δ, 62Σ. The function block having a function of monitoring the ratio of signal intensities of the difference signal Δout and the sum signal Σout, and performing the control of gain switching of the variable gain units 45Δ, 45Σ based on the intensity ratio, for example, performing the control of gain switching of the variable gain units 45Δ, 45Σ using, as a condition, a time when the intensity ratio becomes greater than or equal to a predetermined threshold value.

An AGC (Auto Gain Control) may be used in place of the variable gain unit 45Σ, 45Δ. The AGC requires linear gain change characteristic with respect to the control input, and thus the circuit configuration is complicating and is also weak to change in ambient environment. The PGA has a feature in that gain varying of satisfactory accuracy can be realized with a simple configuration of only the switch and the amplifier since the gain switching is discrete. That is, in view of embodying the mono-pulse radar with enhanced accuracy, adopting the variable gain units 45Σ, 45Δ capable of performing a discrete gain switching is more suitable.

In the present embodiment, the threshold value determining portion 62Δ for the difference signal Δ and the threshold value determining portion 62Σ for the sum signal Σ are arranged, that is, the monitoring of the signal intensity of both the difference signal Δ and the sum signal Δ is performed, but the present invention is not limited thereto, and either one may be monitored. It should be noted that with the monitoring of only one of the signals, erroneous detection may occur due to fluctuation of the signal intensity caused by distance decay and change in reflectivity. That is, in view of such aspect, it is more suitable to monitor the signal intensity of both the difference signal Δ and the sum signal Σ.

Although not shown, an arbitrary calculating method of either the fixed point calculation or the floating point calculation can be selected for each block in the calculation processing unit.

The series of processes (or process of one part), for example, the process according to the state transition diagram of FIG. 5 can be executed by hardware or may be executed by software.

Figure 7:
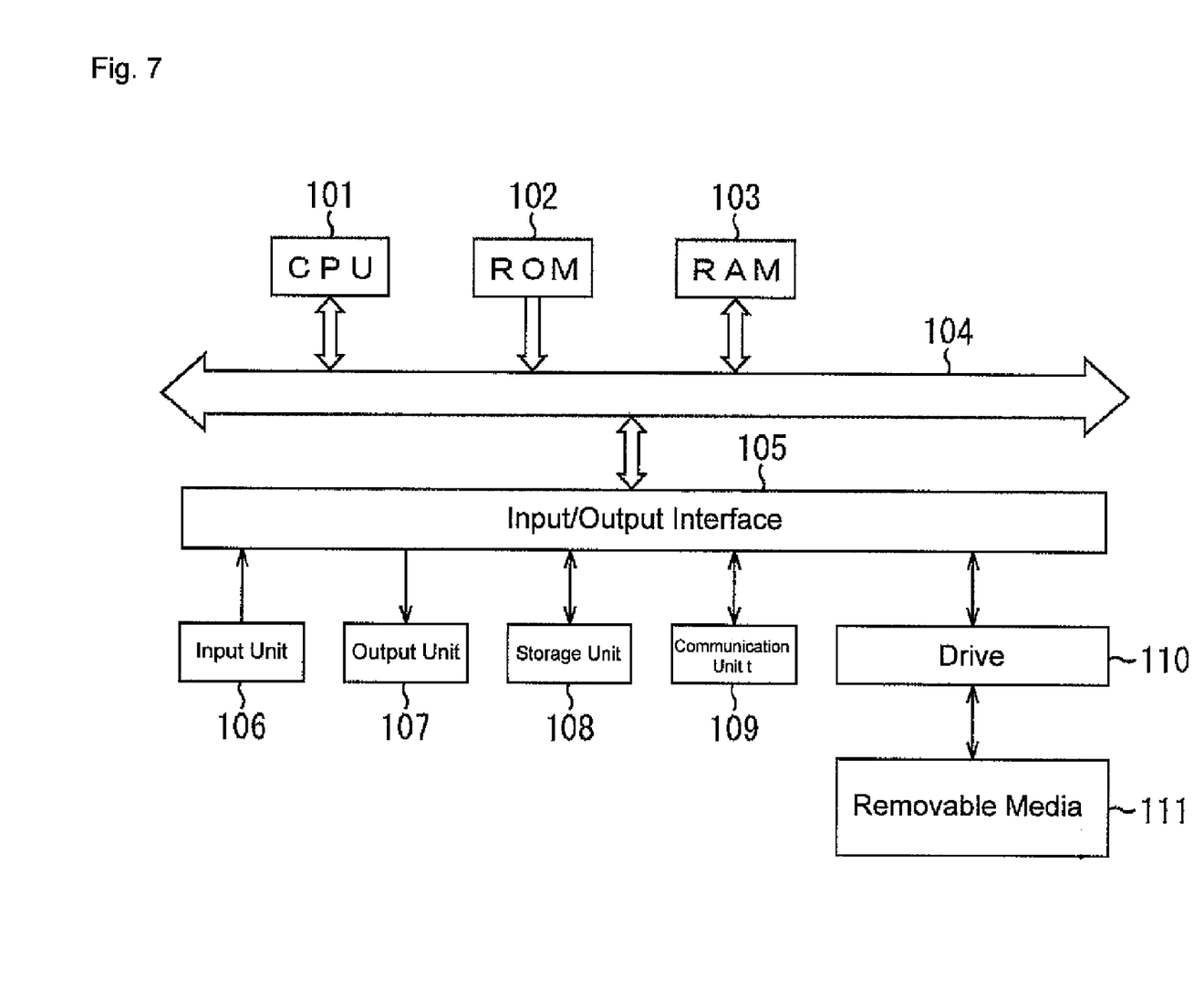
FIG. 7 shows a block diagram showing an entire or partial hardware configuration example of the mono-pulse radar applied with one or more embodiments of the present invention.

When executing the series of processes (or process of one part) by hardware, at least one part of the mono-pulse radar 21, for example, the calculation processing unit 47 or the like can be configured by a computer as shown in FIG. 7.

In FIG. 7, the CPU (Central Processing Unit) 101 executes various processes according to a program recorded on a ROM (Read Only Memory) 102 or a program loaded to a RAM (Random Access Memory) 103 from a storage unit 108. The RAM 103 is also appropriately stored with data necessary for the CPU 101 to execute various processes.

The CPU 101, the ROM 102, and the RAM 103 are interconnected by way of a bus 104. The bus 104 is also connected with an input/output interface 105.

The input/output interface 105 is connected with an input unit 106 including keyboard, mouse and the like, an output unit 107 including a display and the like, the storage unit 108 configured by a hard disc and the like, and a communication unit 109 configured by a modem, a terminal adapter and the like. The communication unit 109 performs communication process with another device through a network including Internet. The communication unit 109 also performs transmission/reception process of transmitting a transmission signal from the transmission antenna (transmission antenna 31 in the example of FIG. 3), which is not shown in FIG. 7, and receives the reception signal with respect to the relevant transmission signal from the reception antenna (reception antennas 32L, 32R in the example of FIG. 3), which is not shown in FIG. 7.

The input/output interface 105 is also connected with a drive 110, as necessary, a removable media 111 such as magnetic disc, an optical disc, a magnetic optical disc, a semiconductor memory, or the like is appropriately attached thereto, and the computer program read therefrom is installed in the storage unit 108 as necessary.

When executing the series of processes by software, the program configuring the software is installed from the network or the recording medium to the computer incorporated in a dedicated hardware or a universal personal computer capable of executing various functions by installing various programs.

As shown in FIG. 7, the recording medium containing the program is not configured only by the removable media (package media) 111 such as the magnetic disc (including floppy disc), optical disc (including CD-ROM (Compact Disk-Read Only Memory), DVD (Digital Versatile Disk)), magnetic optical disc (including MD (Mini-Disk)), or semiconductor memory recorded with program and distributed to provide the program to the user separate from the device body, but may be configured by the ROM 102 recorded with the program and the hard disc included in the storage unit 108 provided to the user in a state incorporated in the device body in advance.

In the present specification, the steps describing the program recorded on the recording medium obviously include processes performed in time-series in order, but also includes processes executed in parallel or individually even if not necessarily processed in time-series.

The present invention is applicable not only to the mono-pulse radar 21, but also to devices and systems of various configurations. The system referred to herein represents the entire device configured by a plurality of processing devices and processing units.

What is claimed is:

1. A radio detection device including two or more reception antennas, for detecting a detecting object by a mono-pulse method; the radio detection device comprising:
    a variable gain unit for discretely changing respective signal intensity of a difference signal and a sum signal of each reception signal received by the two or more reception antennas;
    an A/D conversion unit for performing A/D conversion process on the difference signal or the sum signal, the difference signal or the sum signal having the signal intensity changed by the variable gain unit;
    an angle calculating portion for calculating an angle by the mono-pulse method using the difference signal and the sum signal after the A/D conversion process by the A/D conversion unit; and
    a control unit for performing a control of individually switching a conversion magnification of the signal intensity by the variable gain unit with respect to the difference signal and the sum signal.

2. The radio detection device according to claim 1, wherein the control unit compares the respective signal intensity of the difference signal and the sum signal with a predetermined threshold value, and performs a control of switching the conversion magnification of the variable gain unit based on the result.

3. The radio detection device according to claim 2, wherein the control unit comprises:
    a difference signal peak/holding portion for holding a peak value and a bottom value of the difference signal outputted in a predetermined period by the A/D conversion unit;
    a difference signal threshold value determining portion, set with a peal value threshold value and a bottom value threshold value as the predetermined threshold value, for comparing the peak value held in the difference signal peak/bottom holding portion and the peak value threshold value, comparing the bottom value held in the difference signal peak/bottom holding portion and the bottom value threshold value, and determining a conversion magnification with respect to the difference signal of the variable gain unit based on the results of the comparisons;
    a sum signal peak/bottom holding portion for holding a peak value and a bottom value of the sum signal outputted in a predetermined period by the A/D conversion unit; and
    a sum signal threshold value determining portion, set with a peak value threshold value and a bottom value threshold value as the predetermined threshold value, for comparing the peak value held in the sum signal peak/bottom holding portion and the peak value threshold value, comparing the bottom value held in the sum signal peak/bottom holding portion and the bottom value threshold value, and determining a conversion magnification with respect to the sum signal of the variable gain unit based on the results of the comparisons.

4. The radio detection device according to claim 3, wherein the threshold value determining portion determines one of A times and B times, wherein A and B are different numerical values as the conversion magnification on the difference signal and the sum signal of the variable gain unit.

5. The radio detection device according to claim 4, wherein
    as a state of the radio detection device, a first state in which the conversion magnification of the variable gain unit is A times and a second state in which the conversion magnification of the variable gain unit is B times independently exist for the sum signal and the difference signal;
    as the peak value threshold value, a threshold value used when the conversion magnification of the variable gain unit is B times is set as +Th_H, and a threshold value used when the conversion magnification is A times is set as +Th_L;
    as the bottom value threshold value, a threshold value used when the conversion magnification of the variable gain unit is B times is set as −Th_H, and a threshold value used when the conversion magnification is A times is set as −Th_L;
    a full scale range of the A/D conversion unit is described as FSR, a center value of the FSR is described as zero, a value of half of the FSR on the peak side with respect to zero is described as +FSR/2, and a value of half of the FSR on the bottom side with respect to zero is described as −FSR/2; and
    the difference signal threshold value determining portion or the sum signal threshold value determining portion performs a control with respect to a target signal, which is the difference signal or the sum signal, to determine the conversion magnification on the target signal of the variable gain unit, wherein the control comprises:
        maintaining the first state when a peak value is between +Th_L and +FSR/2 or a bottom value is between −Th_L and −FSR/2 in the first state with respect to the target signal of a predetermined period,
        transitioning to the second state when a peak value is between +Th_L and 0 and a bottom value is between −Th_L and 0 in the first state with respect to the target signal of the predetermined period,
        maintaining the second state when a peak value is between +Th_H and 0 and a bottom value is between −Th_H and 0 in the second state with respect to the target signal of the predetermined period, and maintaining the second state when a peak value is between +Th_H and +FSR/2 or a bottom value is between −Th_H and −FSR/2 in the second state with respect to the target signal of the predetermined period.

6. The radio detection device according to claim 4, wherein the angle calculating portion calculates the angle using a quantity of (1/A) times a quantity corresponding to the signal intensity of the target signal after the A/D conversion process when the conversion magnification with respect to the target signal of the variable gain unit is A times; and calculates the angle using a quantity of (1/B) times a quantity corresponding to the signal intensity of the target signal after the A/D conversion process when the conversion magnification with respect to the target signal of the variable gain unit is B times.

7. A radio detection method of a radio detection device including two or more reception antennas, for detecting a detecting object by a mono-pulse method; wherein when the radio detection device includes, a variable gain unit for discretely changing respective signal intensity of a difference signal and a sum signal of each reception signal received by the two or more reception antennas;

an A/D conversion unit for performing A/D conversion process on the difference signal or the sum signal the difference signal or the sum signal having the signal intensity changed by the variable gain unit; and an angle calculating portion for calculating an angle by the mono-pulse method using the difference signal and the sum signal after the A/D conversion process by the A/D conversion unit;

wherein the radio detection method comprises:

performing a control of individually switching a conversion magnification of the signal intensity by the variable gain unit with respect to the difference signal and the sum signal.

\* \* \* \* \*